United States Patent [19]
Jakobs et al.

[11] Patent Number: 5,944,151
[45] Date of Patent: Aug. 31, 1999

[54] OPERATING DEVICE

[75] Inventors: Hasko Jakobs, Hofheim; Heinz Bernhard Abel, Aschaffenburg, both of Germany

[73] Assignee: VDO Adolf Schindling AG, Frankfurt, Germany

[21] Appl. No.: 08/677,138

[22] Filed: Jul. 9, 1996

[30] Foreign Application Priority Data

Aug. 3, 1995 [DE] Germany .......................... 195 28 457

[51] Int. Cl.⁶ .............................. F16F 15/03; G05B 9/02
[52] U.S. Cl. .................................... 188/267.1; 188/267.2; 318/566; 318/568.1
[58] Field of Search ................................ 188/267, 267.1, 188/267.2, 266.7, 158, 161, 162, 156; 318/566, 568.1, 628, 162

[56] References Cited

U.S. PATENT DOCUMENTS 5,012,292  4/1991  Ruff ......................................... 335/253
5,191,971  3/1993  Hakkarainen et al. ................. 200/550
5,381,080  1/1995  Schnell et al. ........................... 318/566

FOREIGN PATENT DOCUMENTS 4205875  9/1993  Germany .

Primary Examiner—Peter M. Poon
Attorney, Agent, or Firm—Martin A. Farber

[57] ABSTRACT

An operating device with haptic response for the manual entering of information into a device comprises a setting member having a position which is variable under the action of an actuating force, and with which there is connected a transducer for producing electric signals which characterize the position of the setting member. There is connected with the setting member a braking element which, under control by the electric signals, exerts a force on the setting member, the value of which force depends on the position of the setting member. The braking element has at least two surfaces which are movable relative to each other and between which there is provided a force transmitting fluid the transmission properties of which can be varied by the electric signals.

27 Claims, 4 Drawing Sheets

OPERATING DEVICE

FIELD AND BACKGROUND OF THE INVENTION

The present invention relates to an operating device with haptic response for a manual entering of information into a device, the device comprising a setting member having a position which can be varied under the action of an actuating force. The setting member is connected to a transducer for producing electric signals which characterize the position of the setting member. A braking element is connected to the setting member and, under control by the electric signals, exerts a force on the setting member, the magnitude of the force depending on the position of the setting member.

In an operating device of this type which is known from Federal Republic of Germany A-42 05 875, there is provided as a braking member an electric motor which has the advantage that it can effect not only a braking of movement but also an acceleration of movement. However, the electric motor is heavy, requires high currents, and takes up a large amount of space, which is disturbing, particularly upon use in a motor vehicle. In operating devices of this type, it has been found that one can dispense with the acceleration of movement by the drive motor and thus employ only a programmable braking force. Thereby the above-mentioned disadvantages of the electric motor can be avoided.

SUMMARY OF THE INVENTION

It is an object of the invention so to develop an operating device or apparatus of the aforementioned type that a freely variable haptic response can be obtained at only slight structural expense and with only a small amount of space being required.

According to the invention, proceeding from the operating device indicated above, the brake element (3) has at least two surfaces (31, 33; 43, 44) which are movable relative to each other and between which a force transmitting fluid or a force transmitting element is provided, the transmission properties of which can be varied by the electric signals. Force transmitting fluids or force transmitting elements suitable for this are of relatively small size and low weight and, furthermore, require only a slight amount of electric energy for their programmable control in order to obtain the desired haptic effect. Since, in accordance with the invention, only used as braking elements are fluids or elements the properties of which can be reproducibly varied as desired by suitable electrical control, the braking element is practically free of wear.

The force transmitting fluid can, with particular advantage, be an electroviscous fluid. Such electroviscous fluids or liquids have, as a function of the intensity of the electric field applied, a variable viscosity which is produced by an orientation of molecules in long chains within the fluid when an electric field is present. Without such an electric field, the molecules present in the fluid are distributed at random. The change in viscosity is obtained by means of two electrically conductive surfaces (31, 33), which are movable relative to each other, and to which the direct or alternating electric field controlled by the electric signals can be applied. As a function of the electric field, the resistance or braking upon the movement of the setting member can be varied within wide limits, as a result of which the desired haptic effect can be obtained.

In a similar manner, if a magnetoviscous material is used, it can be influenced by the application of a magnetic field. The force transmitting fluid may be a magnetoviscous fluid.

A magnetic field can be applied to the two surfaces (31, 33) which are movable relative to each other.

For the same purpose, there can also be used as a force transmitting element, an acoustoviscous fluid which can be controlled by ultrasonics which can be produced by piezoelectric elements controlled by the electric signals.

In an advantageous manner, there can also be used as a force transmitting element, piezoelectric or magnetostrictive elements which experience a change in volume under electric control. Thus, such elements are suitable for use in connection with a setting element in which the surfaces are movable relative to each other and are provided with closely interengaging tongue-and-groove-like guide rails (43, 44). Upon the guide rails, there are arranged the piezoelectric or magnetostrictive elements which, by their change in volume, produce a braking action between the associated surfaces of the guide rails.

An electromagnetically actuatable brake can also be provided as a force transmitting element.

In a further development of the invention, the transducer (2) is an incremental generator which generates pulses as a function of the distance moved, and direction of movement of the setting member (1). In this connection, it is advantageous that pulse addresses be produced for a table stored in a memory (8) in which table control signals for the braking element (3) are stored as a function of the address.

By a storing of the tables in a memory, or by calculation of characteristic curves in real time, differing haptic responses can be realized. The use of an incremental generator permits advantageous communication by means of digital signals between the operating device of the invention and the apparatus to be operated.

An adaptation of the haptic response to the situation present upon the specific condition of operation of the device to be operated is possible, in accordance with another feature of the invention, by loading different functions into the memory (8) under the control of a device (11) which is connected to the operating device. For the same purpose, the table can also contain several different functions, each of which can be selected via one or more binary places of the address fed to the memory (8).

For many uses of the operating device of the invention, an embodiment is advantageous which is characterized by a function which has substantially identical, periodically recurring sections. In this way an operating device is produced which has detent steps which are identical to each other, in which connection, for instance, the number of detent steps can be adapted to the specific operating situation.

Different large detent steps can also be selected, in which case, furthermore, the expenditure of force from detent step to detent step can be of different amounts. Thus, for instance, two detent points which are frequently used in operation, can lie close together and/or be separated from each other by a slight detent force while movement of the operating device into a position which is used only by way of exception is made difficult by a large path and/or a large opposing force.

The nature of the haptic response can, in accordance with other advantageous features of the invention, also be effected in the manner that the form of the function is variable within a section, and/or that the extreme values of the function are variable.

A further development of the invention is characterized by connection to a device (11) which has a display device or screen (12) for displaying selection menus with selection points, the function being controllable as a function of the number and position of selection points of the menu on the display device.

By this further development, there is obtained a substantial improvement in the operation of devices and systems which include a user guidance by means of selection menus. These may be any electronic device which has a suitable digital signal processing and a display device, for instance a picture tube or an L/C picture screen.

In order to impede the unintentional entry of one or more selection possibilities which are presently difficult, it is provided, in one advantageous embodiment of this further development, that the function be so developed that a force of the braking element (3) which acts in opposition to the actuating force is so great that only the selection points can be controlled by the setting member.

By a switch (13) which is combined with the setting member (1), the selection of the selection points is possible in a particularly simple manner, the direction of actuation thereof differing from the direction of actuation of the setting member.

Upon the use of piezoelectric or magnetostrictive elements it is particularly advantageous for the setting member to be developed from one or more spherical caps (41, 42) which are nested one within the other and, in connection with which, in each case adjacent spherical caps are guided by pre-established guide paths or rails (43, 44), and the different guide paths may extend in different directions.

A further development of the invention provides that, in case of a change in the force transmitting fluid or the force transmitting element as a function of the temperature, there are provided a temperature sensor (17) which detects the temperature of the force transmitting fluid or force transmitting element and a control circuit (16) connected to it for the temperature-dependent variation in voltage of the electric signals.

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
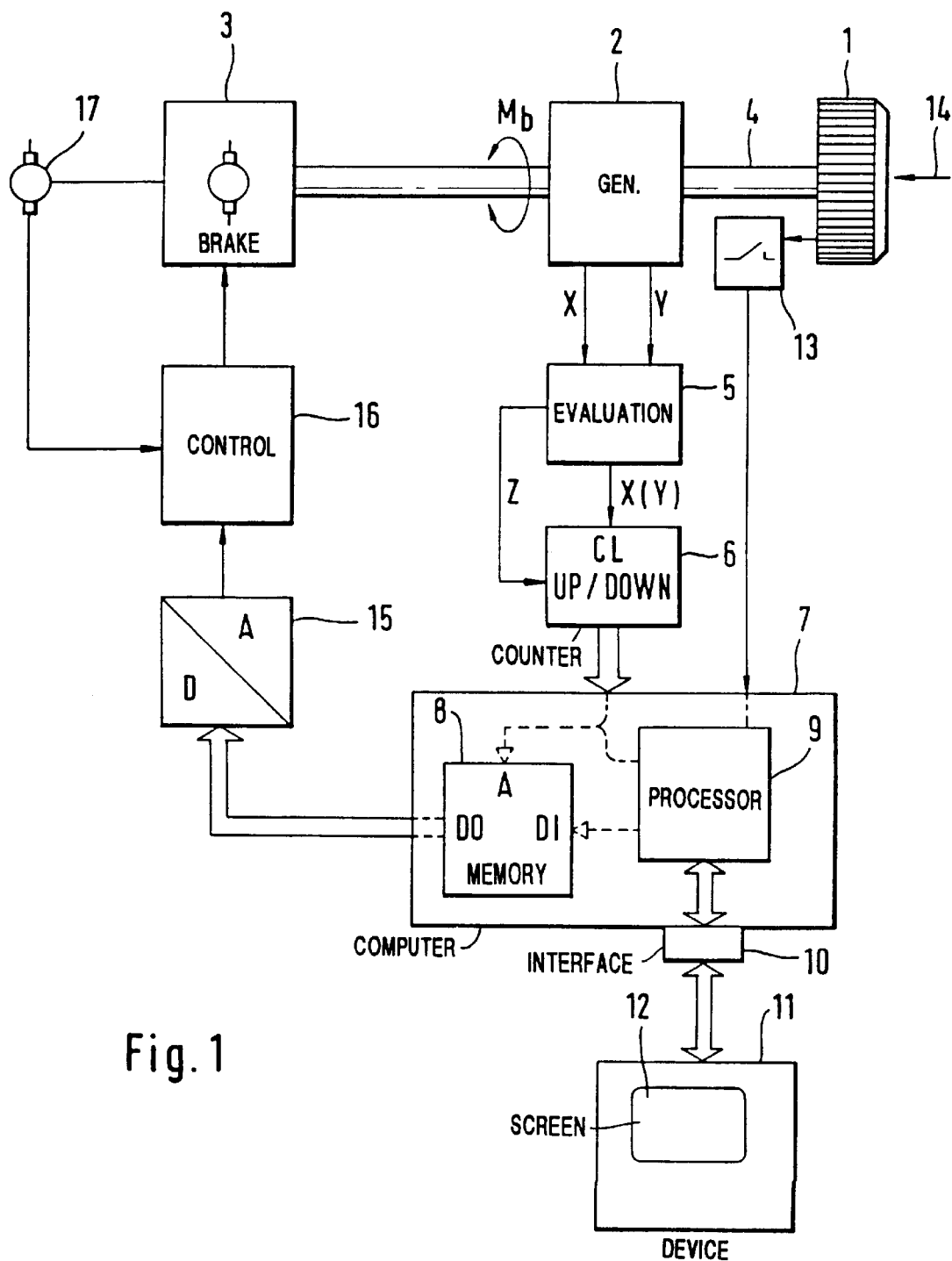
FIG. 1 is a block diagram having a setting member, a braking member with optical response, the evaluation and control electronics, and the electronic device to be operated.

In the embodiment shown in FIG. 1, the mechanical part of the operating apparatus comprises a rotary knob 1, a transducer developed in the form of an incremental generator 2, and a braking element 3 with haptic response, which are connected to each other by a shaft 4.

In a known manner, the incremental generator 2 produces, for each angle increment of the shaft 4, two pulses X and Y which are of opposite phase, from which the direction of rotation of the shaft 4 is determined in an evaluation circuit 5. With a direction of rotation signal Z and one of the pulses X or Y an incremental/decremental counter 6 is controlled, there being obtained at its outputs a digital signal which describes the angular position of the rotary knob 1 with respect to its initial position, which may be any desired initial position.

The instantaneous count is entered into a microcomputer 7 which is constructed in known manner and of which only the parts necessary for an understanding, namely a write-read memory 8 for the storing of a table, a microprocessor 9, and an interface 10 are shown. The interface 10 serves for a connection to a device 11 to be operated, which has a picture screen 12.

There is connected to the rotary knob 1 a push key 13 which, when the rotary knob 1 is pushed in the direction indicated by the arrow 14, sends a signal to the microcomputer 7.

An output of the microcomputer 7 is connected via a digital-analog converter 15 to a control circuit 16 for the braking element 3. This circuit 16 contains known end stages and control circuits (not shown). The control circuit 16 is also fed a signal from a temperature sensor 17 which detects the temperature of the braking element 3, as a result of which a temperature-dependent change in voltage of the electric signal for the controlling of the braking element 3 is possible.

Upon the entry of the corresponding table into the write-read memory 8, the addressing and feeding of the data to be recorded is effected by the microprocessor 9. The table has data for operation of the braking element 3.

During the operating steps, the addressing of the write-read memory 8 is effected by the counter 6, while the data read out from an output DO are fed to the digital/analog converter 15. Furthermore, upon the operating steps, the output signals of the counter 6 are fed via the microprocessor 9 and the interface 10 to the device 11 which is to be operated. The different paths of data and addresses are shown in dashed line in the microcomputer 7.

Figure 7:
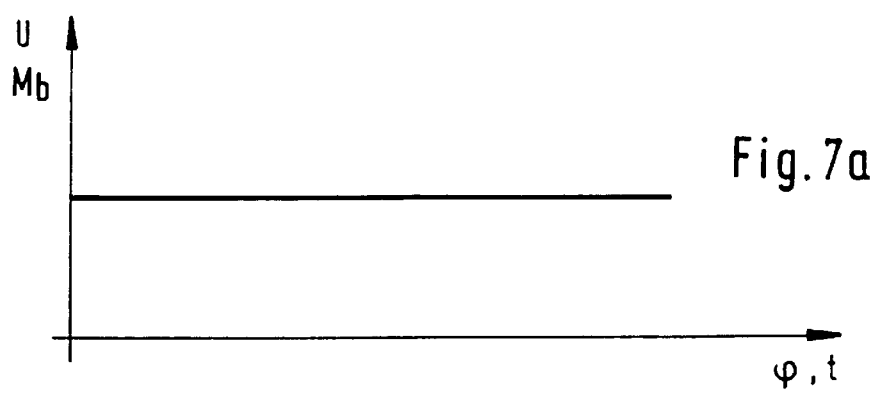
FIG. 7 comprises FIGS. 7a–7d showing various voltage curves for establishing different torques as a function of the angle through which the operating device is rotated.
Figure 7:
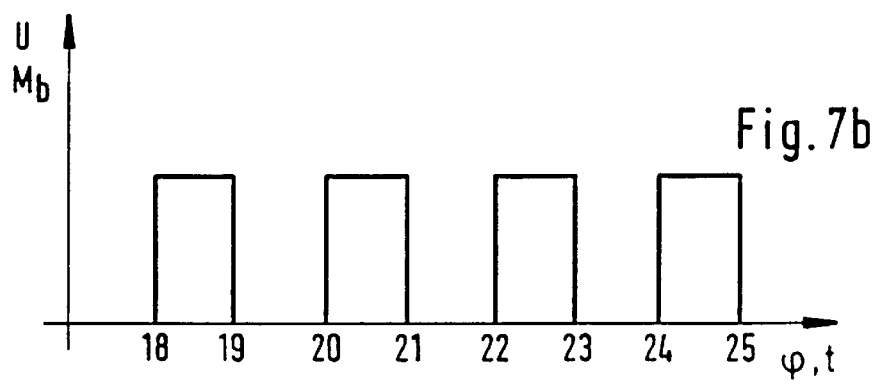
Figure 7:
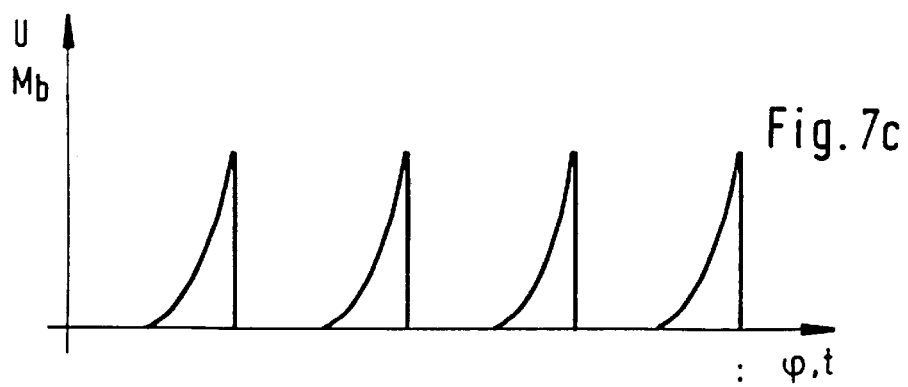
Figure 7:
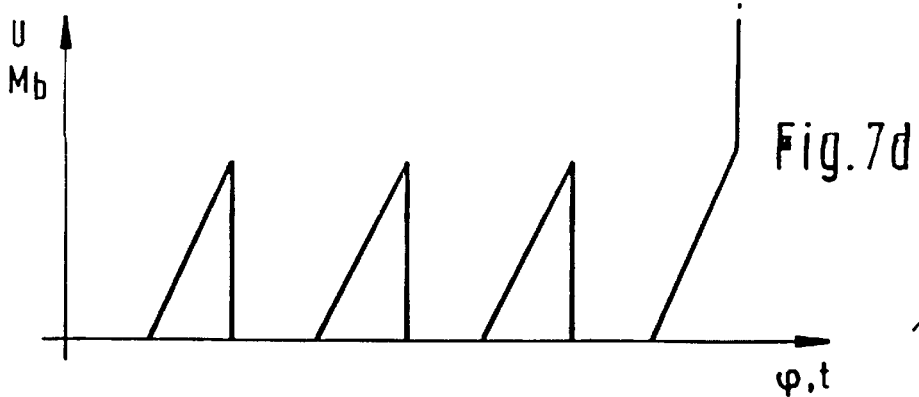

Upon the placing in operation of the device 11 or upon a change in the operating state which requires a different adjustment, data of a table which are to be stored in the write-read memory 8 are fed by the device 11 via the interface 10 to the microcomputer 7. The content of such tables is shown as a graph of the change in voltage for the production of a corresponding course of the braking moment of the braking element 3 as a function of the angle of rotation $\phi$ shown in FIG. 7. At the points of intersection 18 to 25 with the zero axis of the curve in FIG. 7b showing the variation of the voltage or of the braking moment, detent points of the operating device are present.

If, starting from these points, the angle of turn $\phi$ is increased manually, then the braking element 3 opposes the force of actuation of the rotary knob 1 by providing a braking moment $M_b$ which endeavors to reduce the angle of turn $\phi$. As can be noted from FIG. 7, the changes in the braking moment can be adapted to the specific case of use. The variation of the braking moment is proportional to the variation of the voltage which is applied by the control circuit 16 upon the braking element 3 in order to control the haptic response.

FIGS. 2 to 6 show different embodiments of a braking element with adjustable or programmable haptic action, or braking force characteristic. The basic principle of such braking elements is that a force transmitting fluid or force transmitting element, the transmission properties of which can be varied by electric signals, is provided between two surfaces which are movable relative to each other.

Figure 2:
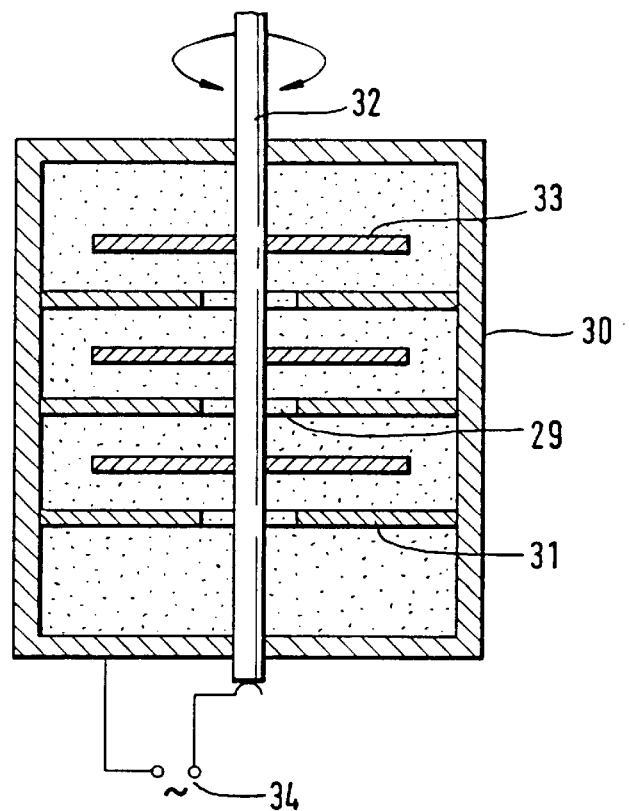
FIGS. 2 to 6 are different embodiments of a braking member.

In accordance with FIG. 2, within a stator which has a housing 30 and, within it, disks 31 which are spaced from each other, there is provided a rotor which comprises a shaft 32 and disks 33 rigidly arranged thereon. The shaft 32 passes through central openings 29 in the stationary disks 31. Within the housing 30, and also between the disks 31 and 33, there is a fluid, the viscosity of which can be varied by the application of a voltage. For this purpose, the stator, which comprises the housing 30 and disks 31, and the rotor, which comprises the shaft 32 and the disks 33, are electrically conductive and insulated from each other. At corresponding connection terminals, designated 34, there can then be applied a voltage coming from the control circuit 16 of FIG. 1, the course of which voltage can be noted from FIG. 7. As fluids, the viscosity of which can be varied in the manner indicated, electroviscous, magnetoviscous, acoustoviscous or similar fluids can be used. Upon the application of an excitation field between the rotor and stator, the viscosity of the fluid is changed, so that a haptically perceptible braking or loosening effect can be established on the rotary or push knob.

Figure 3:
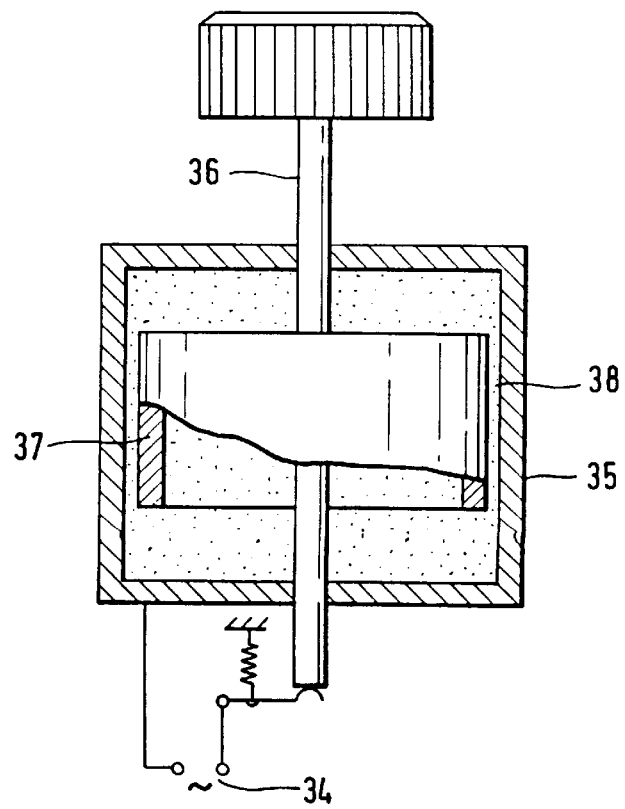

FIG. 3 shows an embodiment of a braking element which can be actuated in both the axial direction and radial direction. In this connection, within a housing 35 of cylindrical shape which serves as a stator, there is present, on a rotatable and displaceable shaft 36, a cylindrical rotor 37 which has a relatively narrow slot 38 between itself and the stator 35. Within the slot 38, there is a fluid having a viscosity which can be controlled by electric signals. In this connection, the braking action takes place between the rotor and stator by change of viscosity of the liquid present in the slot 38, from which it is noted that this braking element is active in the axial and radial direction as a result of the rotatable and displaceable mounting of the shaft, and thus also of the rotor 37.

Figure 4:
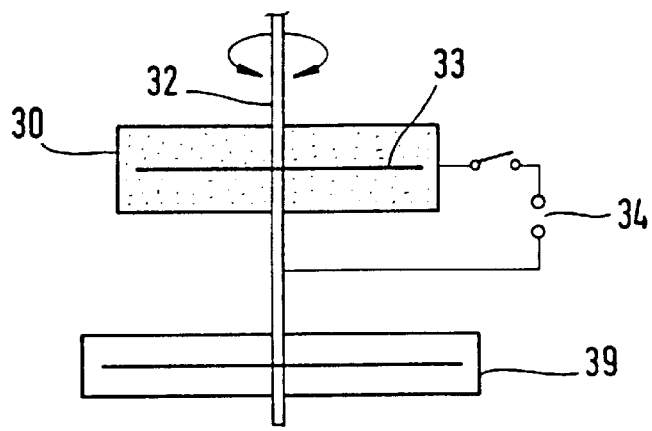

FIG. 4 shows an example of a braking element in which, with a rotor and a stator about the shaft 32, constructed fundamentally in accordance with FIG. 2, there is connected a measurement capacitor 39 which serves as a position measuring device. Connection terminals 34 are provided for receiving an applied voltage from the control circuit 16 of FIG. 1 for control of the braking force.

In the embodiment of FIGS. 2 to 4, electroviscous fillings are provided.

Figure 5:
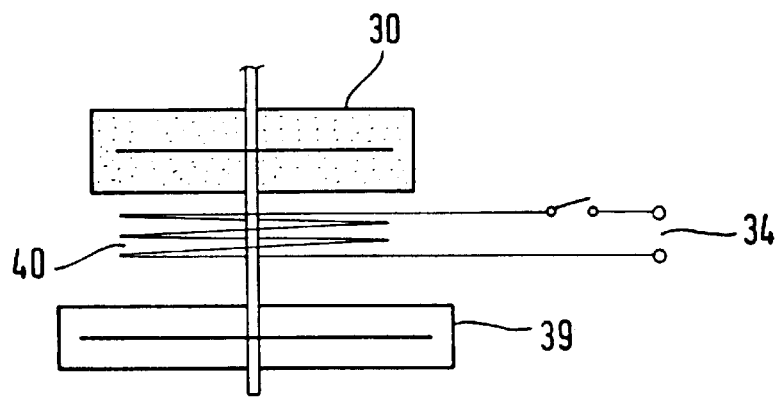

FIG. 5 shows an example of a braking element in accordance with the development of FIG. 4, having a magnetoviscous filling for the influencing of which an electric coil 40 is provided on the outside of the stator 30, to which coil an electric voltage can be applied via connection terminals 34 in order to produce a magnetic field.

Figure 6:
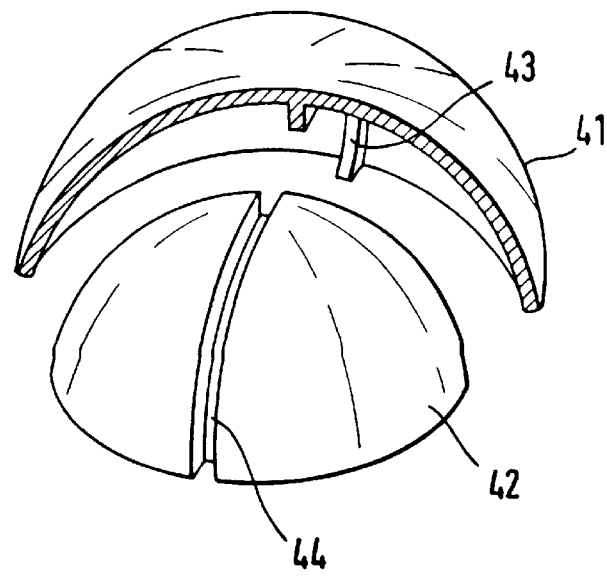

The embodiment of FIG. 6 has an actuating element which also comprises the braking element. In this case there are provided individual shells 41 and 42 which engage in one another and are guided with respect to each other by tongue-and-groove-like guide rails 43 and 44, on which piezoelectric or magnetostrictive elements in the form of foils are arranged. These piezoelectric or magnetostrictive elements can be controlled by electric signals, and have volumes which increase or decrease in response to application of the corresponding electric control, thereby causing a braking action between the guide rails 43, 44. By the provision of several such internested shells with corresponding guide rails which extend in different directions, haptic return effects in different directions of movement can be obtained. In this connection, the forces which are required in order to operate such an actuating element are less than in the case of a rotary knob, since the force of engagement with the hand is less. The advantage of such a haptically programmable actuating element is the possibility of a rapid and targeted movement of a cursor in a picture screen menu since movements of the operating element which do not correspond with the menu can be excluded on basis of the program.

The haptic response is advantageous to a person controlling the knob with his hand, the haptic response being sensed by the person's hand to receive an indication of the location of the cursor on the screen.

We claim:

1. An operating apparatus with haptic response for a manual entering of information into a device, the apparatus comprising:

a setting member, a position of the setting member being variable under the action of an actuating force;

a transducer which is connected to the setting member for producing electric signals which characterize the position of the setting member; and a braking element which is connected to the setting member and, under control by the electric signals, exerts a force on the setting member, a magnitude of the force depending on the position of the setting member;

wherein the brake element has at least two surfaces which are movable relative to each other, and force transmitting means capable of exerting a force between said at least two surfaces, said force transmitting means being a force transmitting fluid or a force transmitting element having force transmission properties which are variable in response to the electric signals.

2. An apparatus according to claim 1, wherein the force transmitting fluid is an electroviscous fluid.

3. An apparatus according to claim 2, wherein the two surfaces of the brake element are electrically conductive and are movable relative to each other; and a change in viscosity is obtained in response to application to the two surfaces of direct or alternating electric field controlled by the electric signals.

4. An apparatus according to claim 1, wherein the force transmitting fluid is a magnetoviscous fluid.

5. An apparatus according to claim 4, further comprising means for generating a magnetic field, wherein the magnetic field is applied to the two surfaces which are movable relative to each other.

6. An apparatus according to claim 1, wherein the force transmitting element is an acoustoviscous medium.

7. An apparatus according to claim 6, wherein the two surfaces comprise piezoelectric elements responsive to the electric signals; and the acoustovicous medium is controlled by ultrasonics produced by the piezoelectric elements.

8. An apparatus according to claim 1, wherein the force transmitting element is a piezoelectric element.

9. An apparatus according to claim 8, wherein the brake surfaces which are movable relative to each other comprise closely interengaging tongue-and-groove-like guide rails, wherein the piezoelectric elements are arranged on the rails, and are controllable by the electric signals.

10. An apparatus according to claim 1, wherein the force transmitting element is a magnetostrictive element.

11. An apparatus according to claim 10, wherein the brake surfaces which are movable relative to each other comprise closely interengaging tongue-and-groove-like guide rails, wherein the magnetostrictive elements are arranged on the rails, and are controllable by the electric signals.

12. An apparatus according to claim 1, wherein the force transmitting element is an electromagnetically actuatable brake.

13. An apparatus according to claim 1, wherein the transducer is an incremental generator which generates pulses as a function of a distance moved and direction of movement of the setting member.

14. An apparatus according to claim 13, further comprising a memory storing a table, and means responsive to the pulses for generating an address;

wherein the addresses are produced for the table stored in a memory, and the table has table control signals for the braking element, the table control signals being stored as a function of the address.

15. An apparatus according to claim 14, wherein the device is connected to the apparatus for control of a loading of different functions into the memory.

16. An apparatus according to claim 15, wherein the device has display means for displaying selection menus with selection points, an individual one of the functions, being controllable as a further function of a number and position of the selection points of the menu on the display means.

17. An apparatus according to claim 16, wherein there is a further force of the braking element which acts in opposition to the actuating force, the further force being so great that only the selection points are controllable by the setting member.

18. An apparatus according to claim 17, further comprising a switch which is combined with the setting member for selection of the selection points, a direction of actuation of the switch differing from a direction of actuation of the setting member.

19. An apparatus according to claim 16, further comprising a switch which is combined with the setting member for selection of the selection points, a direction of actuation of the switch differing from a direction of actuation of the setting member.

20. An apparatus according to claim 14, wherein, the table contains several different functions, each of which is selectable via one or more binary places of the address fed to the memory.

21. An apparatus according to claim 14, wherein the function has substantially identical, periodically recurring sections.

22. An apparatus according to claim 21, wherein the form of the function is variable within one of the sections.

23. An apparatus according to claim 21, wherein the function has extreme values which are variable.

24. An apparatus according to claim 1, wherein the setting member comprises one or more spherical caps which are nested one within the other, wherein the spherical caps are provided with guide paths, and adjacent ones of the spherical caps are guided by the guide paths, the respective guide paths extending in different directions.

25. An apparatus according to claim 1, further comprising a temperature sensor operative, in case of a change in the force transmitting fluid or the force transmitting element as a function of temperature, to detect the temperature of the force transmitting fluid or force transmitting element; and a control circuit connected to the temperature sensor for providing a temperature-dependent variation in voltage of the electric signals.

26. An apparatus according to claim 1, further comprising signal processing means interconnecting said transducer with said device, said signal processing means being responsive to said signals of said transducer for providing an indication on a screen of said device in correspondence with the position of the setting member.

27. An apparatus according to claim 26, wherein said signal processing means connects with said braking element, said signal processing means being responsive to said signals of said transducer for introducing a change in braking force of said braking element upon said setting member in correspondence with a position of said indication on said screen, said setting member being operative by a person's hand, and said change in braking force providing a haptic response to the person's hand to indicate the position of said screen indication.

* * * * *